United States Patent
Schiek et al.

(10) Patent No.: US 12,463,293 B2
(45) Date of Patent: Nov. 4, 2025

(54) TRACTION BATTERY OF A MOTOR VEHICLE

(71) Applicant: Dr. Ing. h.c. F. Porsche Aktiengesellschaft, Stuttgart (DE)

(72) Inventors: Werner Schiek, Jettingen (DE); Ronny Brodersen, Sachsenheim (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 699 days.

(21) Appl. No.: 17/731,315

(22) Filed: Apr. 28, 2022

(65) Prior Publication Data
US 2022/0352602 A1 Nov. 3, 2022

(30) Foreign Application Priority Data
Apr. 29, 2021 (DE) .................. 10 2021 111 099.8

(51) Int. Cl.
*H01M 50/507* (2021.01)
*B60L 50/60* (2019.01)
*H01M 10/613* (2014.01)
*H01M 10/653* (2014.01)
*H01M 50/204* (2021.01)

(52) U.S. Cl.
CPC .......... *H01M 50/507* (2021.01); *B60L 50/60* (2019.02); *H01M 10/613* (2015.04); *H01M 10/653* (2015.04); *H01M 50/204* (2021.01); *H01M 2220/20* (2013.01)

(58) Field of Classification Search
None
See application file for complete search history.

(56) References Cited

U.S. PATENT DOCUMENTS

| 2020/0136326 A1 | 4/2020 | Rai et al. |
| 2020/0153123 A1* | 5/2020 | Duensbier .............. H01R 13/46 |
| 2020/0169069 A1 | 5/2020 | Hiramitsu et al. |

FOREIGN PATENT DOCUMENTS

| CN | 111193003 A * | 5/2020 | ............. B60L 50/66 |
| DE | 102007063178 A | 6/2009 | |
| DE | 102019122754 A1 | 10/2019 | |

(Continued)

OTHER PUBLICATIONS

Machine English translation of WO-2020028931-A1, Reingruber et al. (Year: 2020).*

(Continued)

*Primary Examiner* — Jeffrey T Barton
*Assistant Examiner* — Karen J. Armstrong
(74) *Attorney, Agent, or Firm* — Buchanan Ingersoll & Rooney PC (57) ABSTRACT

A traction battery for a motor vehicle includes a plurality of battery modules. The battery modules of the traction battery are electrically coupled by electrical busbars. Each battery module includes a module housing and battery cells accommodated in the respective module housing. The battery cells of each battery module are electrically coupled. At least one thermally conductive body is arranged between the electrical busbars, which are used to electrically couple the battery modules, and an adjoining housing of the traction battery or an adjoining structural component of a body of the motor vehicle or an adjoining module housing of a battery module.

16 Claims, 5 Drawing Sheets

(56) References Cited

FOREIGN PATENT DOCUMENTS

| | | | |
|---|---|---|---|
| DE | 102020111189 A1 | 10/2021 | |
| GB | 2574563 A | 12/2019 | |
| WO | 2009080149 A1 | 7/2009 | |
| WO | 2018105610 A1 | 6/2018 | |
| WO | WO-2020028931 A1 * | 2/2020 | ........ H01M 10/0422 |

OTHER PUBLICATIONS

English translation of the Chinese Office Action for Chinese Application No. 2022104446853, issued Jan. 8, 2024, 7 pages.

* cited by examiner

TRACTION BATTERY OF A MOTOR VEHICLE

CROSS-REFERENCE TO RELATED APPLICATION

This application claims priority to German Patent Application No. 10 2021 111 099.8, filed Apr. 29, 2021, the content of such application being incorporated by reference herein in its entirety.

FIELD OF THE INVENTION

The invention relates to a traction battery of a motor vehicle.

BACKGROUND OF THE INVENTION

A traction battery of a motor vehicle in the form of an electric vehicle or hybrid vehicle is used to store electrical drive energy for the motor vehicle. A traction battery of this kind has a plurality of battery modules, wherein each battery module has a module housing and battery cells accommodated by the module housing. A traction battery may have a battery housing that accommodates the battery modules and provides a seal against the surroundings. If there is no separate battery housing, the module housings of the battery modules seal the battery cells for each battery module individually against the surroundings, wherein structural components of a body of the motor vehicle then take on structurally reinforcing functions of a battery housing.

The battery cells of each battery module of a traction battery are coupled to one another by means of electrical busbars. These electrical busbars, which are used to electrical couple the battery cells of a respective battery module, extend within the module housing of the respective battery module.

The battery modules of a traction battery are electrically coupled by means of electrical busbars. The electrical busbars in this case extend outside of the module housing of the battery modules that are to be coupled.

The electrical busbars, which are used to electrically couple the battery modules of a traction battery, transmit high electric currents. These electrical busbars are therefore also subject to a high degree of heating. Until now, it has been difficult to efficiently dissipate the heat from the electrical busbars used to electrically couple the battery modules of a traction battery.

DE 10 2019 122 754 A1, which is incorporated by reference herein, discloses a battery module of a traction battery of a motor vehicle. The battery module has a plurality of battery cells that are electrically coupled by means of a busbar. The busbar consists of copper and is thermally conductively connected to a heatsink. Heat can thus be dissipated from the respective busbar.

US 2020/0136326 A1, which is incorporated by reference herein, discloses an electrical unit comprising an electrical contact and busbars connected to the electrical contact. The busbars connected to the electrical contact are connected to a heatsink. The heatsink is positioned in this case between the busbars and the electrical contact.

SUMMARY OF THE INVENTION

Although the prior art discloses embodiments for cooling busbars used to electrically couple the battery cells of a battery module of a traction battery, the prior art does not disclose any embodiments for effectively protecting the electrical busbars of a traction battery of a motor vehicle used to electrically couple the battery modules of the traction battery from thermal overloading.

Described herein is a novel traction battery of a motor vehicle in which the electrical busbars used to electrically couple the battery modules of the traction battery are effectively protected from thermal overloading.

According to aspects of the invention, at least one thermally conductive body is arranged between the electrical busbars, which are used to electrically couple the battery modules, and an adjoining housing of the traction battery or an adjoining structural component of a body of the motor vehicle or an adjoining module housing of a battery module.

Using the invention present here, it is first proposed to arrange a thermally conductive body between the electrical busbars, which are used to electrically couple battery modules of a traction battery, and an adjoining component in order to deflect heat from the respective electrical busbar to the respective adjoining component via said thermally conductive body and thus to protect the electrical busbar from excessive thermal overloading.

The adjoining housing of the traction battery or the adjoining structural component of the body of the motor vehicle or the adjoining module housing of the battery module is preferably actively cooled, in particular fluid-cooled, and/or coupled to an actively cooled, in particular fluid-cooled, component. This can be used to dissipate the heat in a particularly advantageous manner.

According to a first advantageous development, at least one of the electrical busbars used to electrically couple the battery modules of the traction battery has a busbar core composed of an electrically conductive material and a busbar housing made of an electrically non-conductive material and surrounding the outside of the busbar core at a distance. A first thermally conductive body is arranged between the busbar core and the busbar housing of the respective electrical busbar. A second thermally conductive body is arranged between the busbar housing of the respective electrical busbar and the adjoining housing of the traction battery or the adjoining structural component of the body of the motor vehicle or the adjoining module housing. The electrical busbars according to the first advantageous development are in particular those busbars of a traction battery that are relatively short and are used to electrically couple, in particular directly adjacent, battery modules of the traction battery.

According to a second advantageous development, at least one of the busbars used to electrically couple the battery modules of the traction battery has a busbar core made of an electrically conductive material and a busbar sheath made of electrically non-conductive material and surrounding the outside of the busbar core, said busbar sheath bearing directly against the busbar core of the respective electrical busbar. A thermally conductive body is arranged between the busbar sheath of the respective electrical busbar and the adjoining housing of the traction battery or the adjoining structural component of the body of the motor vehicle or the adjoining module housing. The electrical busbars according to the second advantageous development of the invention are in particular busbars that are formed to be relatively long and in particular electrically couple battery modules of the traction battery that are spaced further apart to one another.

In the second advantageous development, the respective thermally conductive body couples the respective busbar directly to a cover component or bottom component, additionally to a frame component indirectly via an EMC carrier, said frame component forming a side wall of the housing of the traction battery or the adjoining structural component of the body. This can be used to dissipate heat from the respective busbar via two paths.

BRIEF DESCRIPTION OF THE DRAWINGS

Preferred developments of the invention will emerge from the dependent claims and the description below. Exemplary embodiments of the invention will be explained in more detail on the basis of the drawing, without being restricted thereto. In the FIGs.:

DETAILED DESCRIPTION OF THE INVENTION

The invention relates to a traction battery of a motor vehicle. Such a traction battery of a motor vehicle is used to store electrical drive energy for the motor vehicle. A traction battery has a plurality of battery modules, wherein each battery module has a plurality of battery cells.

Figure 1:
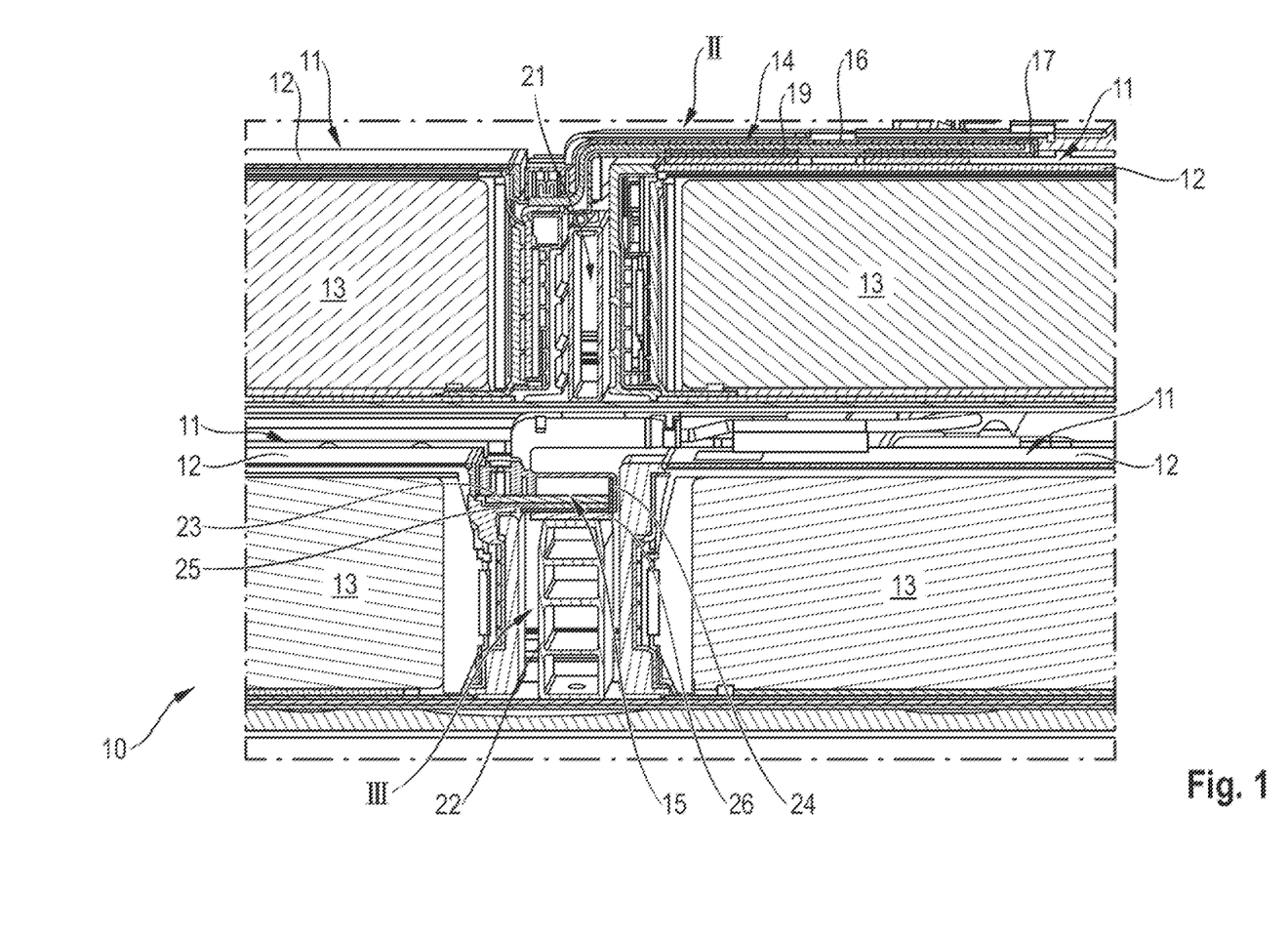
FIG. 1 shows a section of a traction battery in the region of four battery modules arranged next one another and above one another.

FIG. 1 shows a section of a traction battery 10 of a motor vehicle in the region of four battery modules 11, wherein the battery modules 11 shown in FIG. 1 are arranged next one another on the one hand and above one another on the other hand. Each battery module 11 has a module housing 12 and battery cells 13 arranged in the module housing 12. The battery cells 13 of each battery module 11 are electrically coupled by means of electrical busbars. These electrical busbars used to electrically couple the battery cells 13 of a respective battery module 11 are also referred to as bus bars.

Figure 2:
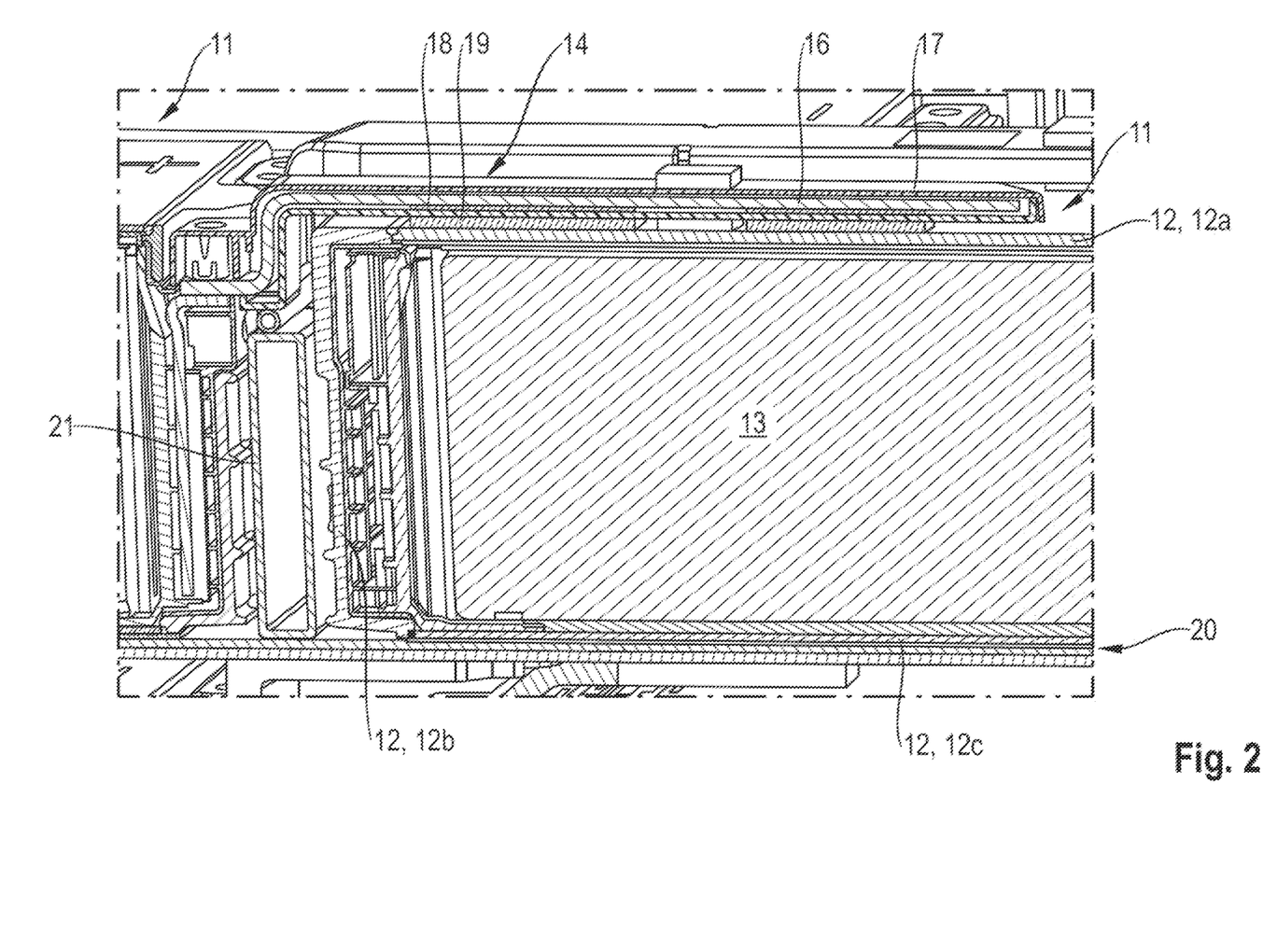
FIG. 2 shows a first detail II of FIG. 1 in the region of a battery module and a busbar used to couple the battery module to another battery module.
Figure 3:
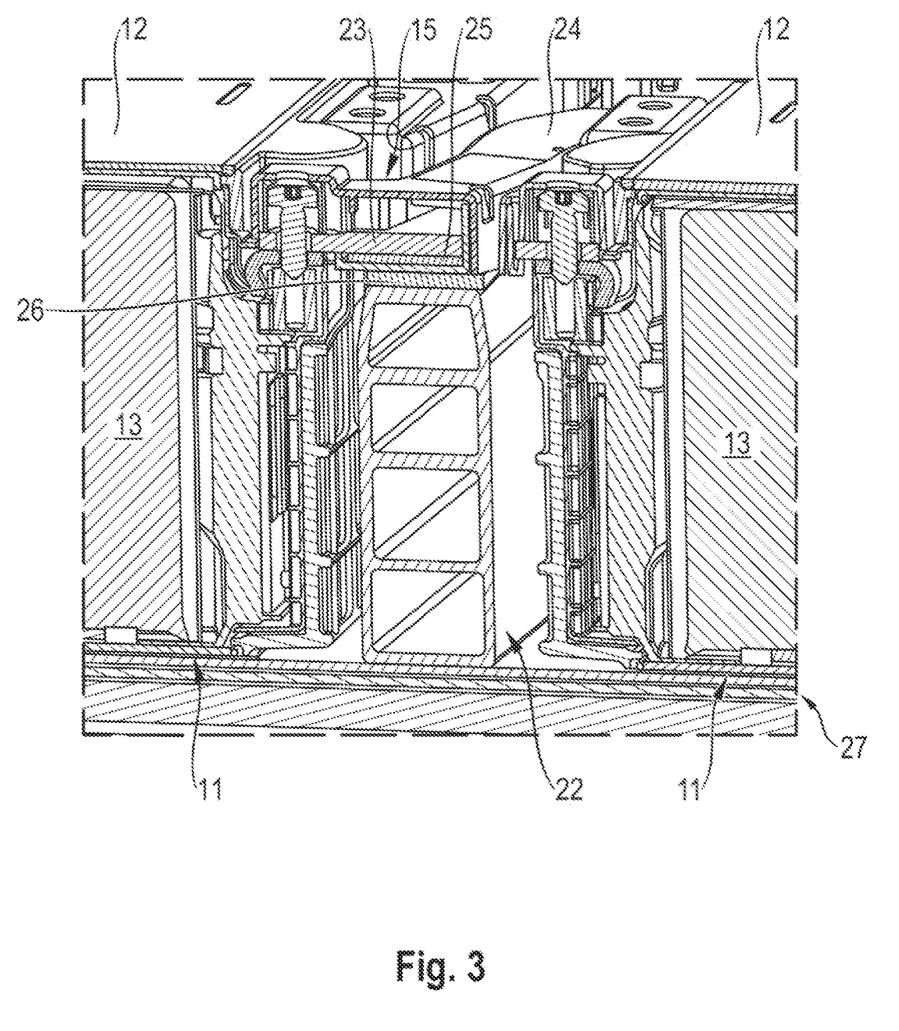
FIG. 3 shows a second detail III of FIG. 1 in the region of a battery module and a busbar used to couple the battery module to another battery module.

In a traction battery 10, the battery modules 11 are also electrically coupled, and specifically by means of busbars, wherein the busbars 14, 15 shown in FIG. 1 are shown in greater detail in FIG. 2 and FIG. 3.

The concept described herein involves effectively dissipating heat from the electrical busbars, which are used to electrically couple the battery modules 11, in order to protect said battery modules from thermal overloading.

According to aspects of the invention, at least one thermally conductive body is arranged between a respective electrical busbar, which is used to electrically couple the battery modules 11 of the traction battery 10, and an adjoining housing of the traction battery 10 or an adjoining structural component of a body of the motor vehicle or an adjoining module housing 12 of an adjoining battery module 11, wherein heat can be dissipated from the respective busbar in the direction of the respective adjoining component by means of said thermally conductive body.

In this case, the respective adjoining component, that is to say the adjoining housing of the traction battery 10 or the adjoining structural component of the body of the motor vehicle or the adjoining module housing 12, is preferably actively cooled and/or coupled to an actively cooled component, wherein in this case the heat can then be dissipated particularly effectively.

An actively cooled component is in particular a fluid-cooled component, such as a water-cooled component.

FIG. 2 shows the detail II of FIG. 1 in the region of a first electrical busbar 14 used to electrically contact-connect the battery module 11 shown in FIG. 2 to another battery module 11, wherein said two battery modules 11 to be electrically coupled by means of the first electrical bus bar 14 are arranged directly next to one another in a top plane in FIG. 1.

The electrical busbar 14 shown in FIG. 2 and used to electrically couple two battery modules 11 has a busbar core 16 composed of an electrically conductive material, such as for example copper, and a busbar housing 17 composed of an electrically non-conducting material, such as for example plastic, and surrounding the outside of the busbar core 16 at a distance.

A first thermally conductive body 18 is arranged between the busbar core 16 and the busbar housing 17 of the busbar 14 shown in FIG. 2, wherein said thermally conductive body 18 thermally couples the busbar core 16 to the busbar housing 17. In addition, a second thermally conductive body 19 is arranged between the busbar housing 17 and the adjoining module housing 12 of the battery module 11, said second thermally conductive body thermally coupling the busbar 14 to the battery module housing 12 of the battery module 11.

In this case, the busbar 14 shown in FIG. 2 is thermally coupled to a cover 12a of the module housing 12 of the battery module 11, wherein said cover 12a is thermally coupled to a bottom wall 12c of the module housing 12 via side walls 12b of the module housing 12, said bottom wall being thermally coupled to an actively cooled assembly 20. In FIGS. 1 and 2, said actively cooled assembly 20 is an assembly arranged below the battery module 11 shown in FIG. 2 and above the battery module 11 (see FIG. 1) arranged below said battery module 11. Said assembly 20 is either an assembly of a battery housing or a structural component of a body of the motor vehicle.

The respective first thermally conductive body 18, which is arranged between the respective busbar core 16 and the respective busbar housing 17 of the electrical busbar 14, is a potting compound body composed of a thermally conductive compound, which in the liquid state is arranged in a cavity between the busbar core 16 and the busbar housing 17 and is cured there.

The respective second thermally conductive body 19, which is arranged between the respective busbar housing 17 and the adjoining component, is arranged in FIG. 2 between the busbar housing 17 and the cover 12a of the module housing 12, is preferably a thermally conductive pad.

FIGS. 1 and 2 show a frame component 21 between the battery modules 11 shown there, wherein said frame component 21 may be a side wall of a housing of the traction battery or a structural component of the body of the motor vehicle.

FIG. 1 also shows a frame component 22, which is either a side wall of the housing of the traction battery or an adjoining structural component of the body of the motor vehicle, between the battery modules 11 of the bottom layer of battery modules 11.

FIG. 3 shows the detail III of FIG. 1 of the traction battery 10 in the region of the battery modules 11 of the bottom layer of battery modules 11 shown in FIG. 1, and specifically in the region of a busbar 15 used to electrically couple the battery modules 11 shown in FIG. 3.

This busbar 15 also has a busbar core 23 composed of an electrically conductive material, such as for example copper, and a busbar housing 24 composed of an electrically non-conducting material, such as for example plastic, and surrounding the outside of the busbar core 23 at a distance.

The busbar housing 24 surrounds the outside of the busbar core 23, wherein in FIG. 3, in a manner corresponding to FIG. 2, on the one hand a first thermally conductive body 25 is arranged between the busbar core 23 and the busbar housing 24 and on the other hand a second thermally conductive body 26 is arranged between the busbar housing 24 and the adjoining frame component 22.

The first thermally conductive body 25 is preferably again a potting compound body and the second thermally conductive body 26 is preferably again a thermally conductive pad.

In this way, the busbar core 23 of the busbar 15 shown in FIG. 3 is thermally coupled to the frame component 22 by means of the busbar housing 24, wherein the frame component 22 is thermally coupled to the actively cooled assembly 27 that extends below the frame component 22 and below the battery modules 11.

Said actively cooled component 27 is a bottom component, either the housing of the traction battery or the body of the motor vehicle.

Figure 4:
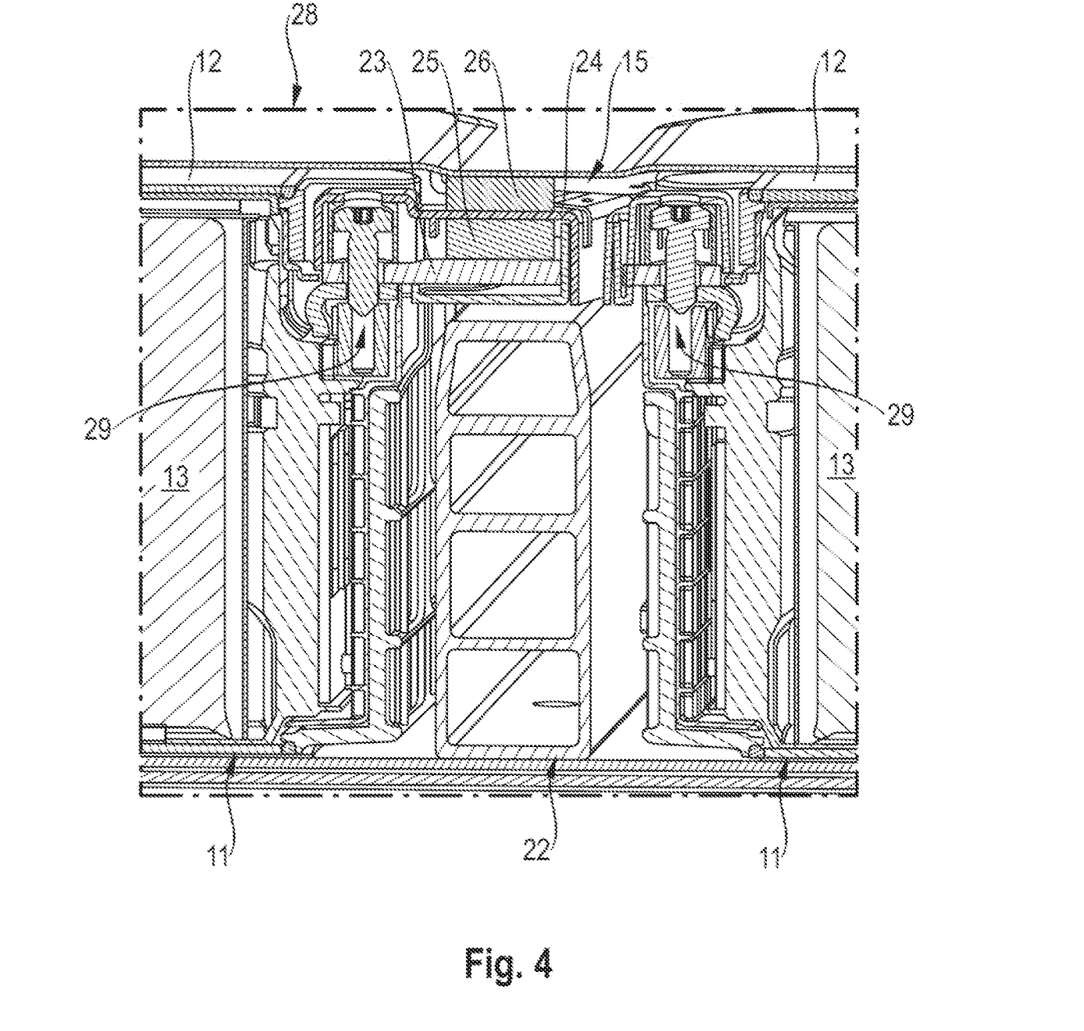
FIG. 4 shows a modification of the detail III of FIG. 3.

FIG. 4 shows a modification of the detail III of FIG. 3 in the region of the busbar 15, wherein in FIG. 4 the busbar 15 is not thermally coupled to the frame component 22 but instead to a cover component 28. Accordingly, in FIG. 4, the first thermally conductive body 25 is again arranged between the busbar core 23 and the busbar housing 24; the second thermally conductive body 26 is arranged between the busbar housing 24 and the cover component 28.

In FIGS. 3 and 4, the contact-connection of the busbar core 23 to electrical terminals 29 of the battery modules 22 can be easily recognized. The busbar 15 shown in FIGS. 3 and 4 is accordingly used to electrically contact-connect the two battery modules 11 positioned next to one another and shown in FIGS. 3 and 4.

Figure 5:
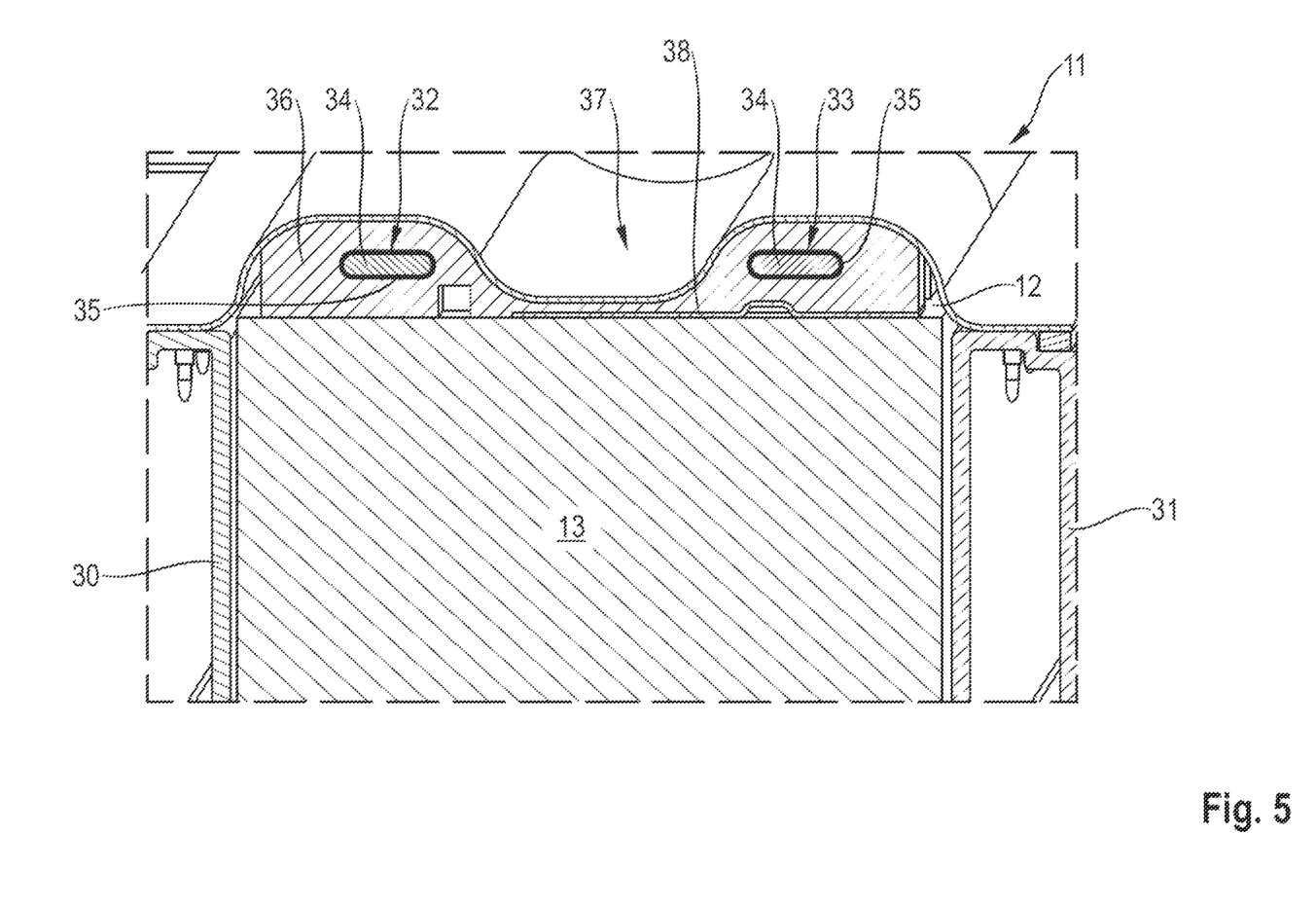
FIG. 5 shows a further section of a traction battery in the region of a battery module and in the region of busbars used to couple the battery module to another battery module.

FIG. 5 shows a further detail of a traction battery 10 according to aspects of the invention in the region of a battery module 11, wherein said battery module 11 is arranged between two frame components 30, 31. Said frame components 30, 31 can again be either a side wall of a battery housing of the traction battery or structural components of a body of the motor vehicle. Two busbars 32, 33 extend above the battery module 11, wherein each of said busbars 32, 33 is used to electrically contact-connect battery modules 11 of the traction battery 10.

Each of these busbars 32, 33 also has a busbar core 34 composed of an electrically conductive material, such as for example copper, and a busbar sheath 35 composed of an electrically non-conducting material, such as for example plastic or rubber, and surrounding the outside of the respective busbar core 34 at a distance. In the case of the electrical busbars 32, 33 of FIG. 5, the respective busbar sheath 35 bears directly against the respective busbar core 34 without a cavity being formed between them. A thermally conductive body 36 is arranged between the busbar sheath 35 of the respective busbar 32, 33 and an adjoining component. Said thermally conductive body 36 is preferably a potting compound body.

In FIG. 5, the potting compound body 36 thermally couples the respective busbar 32, 33 on the one hand directly to a cover component 37 and on the other hand indirectly by means of an EMC carrier 38 in particular to the frame component 31, which is a side wall of the housing of the traction battery or an adjoining structural component of the body of the motor vehicle. The cover component 37 and/or the frame component 31 are thermally coupled to an actively cooled component, in particular to a fluid-cooled component, as has already been described in connection with the details of FIGS. 2, 3, and 4.

The invention can be used to effectively dissipate heat from busbars 14, 15, 32, 33 of a traction battery 10 of a motor vehicle in order to prevent impermissibly high thermal loading of the busbars 14, 15, 32, 33. A higher electric current can flow via the busbars 14, 15, 32, 33 without the risk of thermal overloading. An electric vehicle or hybrid vehicle can thus be operated more effectively, in particular when the traction battery is charged. During charging, it is possible to operate for longer with a higher charging power. This can of course also be carried out during discharge.

What is claimed is:

1. A traction battery for a motor vehicle, the traction battery comprising:
    a plurality of battery modules, wherein each battery module comprises a module housing and battery cells accommodated in the respective module housing, wherein the battery cells of each battery module are electrically coupled together;
    electrical busbars that electrically couple together the plurality of battery modules, wherein each of the electrical busbars comprises (i) a busbar core made of an electrically conductive material, and (ii) a busbar housing made of an electrically non-conductive material that surrounds an outside of the busbar core,
    a first thermally conductive body arranged between (i) a busbar housing of a first electrical busbar of the electrical busbars, and (ii) one of an adjoining housing of the traction battery, an adjoining structural component of a body of the motor vehicle, or an adjoining module housing of one of the battery modules,
    a second thermally conductive body arranged between the busbar core and the busbar housing of the first electrical busbar,
    wherein the second thermally conductive body is a potting compound body.

2. The traction battery as claimed in claim 1, wherein the first thermally conductive body is a thermally conductive pad.

3. The traction battery as claimed in claim 1, wherein at least one of the electrical busbars comprises a busbar sheath bearing directly against the busbar core.

4. The traction battery as claimed in claim 3, wherein the first thermally conductive body couples the busbar directly to a cover component or a bottom component.

5. The traction battery as claimed in claim 3, wherein the first thermally conductive body indirectly couples the first electrical busbar to a frame component, the frame component forming a side wall of a housing of the traction battery or the adjoining structural component of the body.

6. The traction battery as claimed in claim 1, wherein the adjoining housing of the traction battery or the adjoining structural component of the body of the motor vehicle or the adjoining module housing of the battery module is actively cooled and/or is coupled to an actively cooled component.

7. The traction battery as claimed in claim 1, wherein the adjoining housing of the traction battery or the adjoining structural component of the body of the motor vehicle or the adjoining module housing of the battery module is fluid-cooled and/or is coupled to a fluid-cooled component.

8. A motor vehicle comprising the traction battery of claim 1.

9. The traction battery as claimed in claim 1, wherein the first thermally conductive body is arranged between (i) the busbar housing of the first electrical busbar of the electrical busbars and (ii) the adjoining housing of the traction battery.

10. The traction battery as claimed in claim 1, wherein the first thermally conductive body is arranged between and directly contacts (i) the busbar housing of the first electrical busbar of the electrical busbars and (ii) the adjoining housing of the traction battery.

11. The traction battery as claimed in claim 1, wherein the first thermally conductive body is arranged between (i) the busbar housing of the first electrical busbar of the electrical busbars and (ii) the adjoining structural component of the body of the motor vehicle.

12. The traction battery as claimed in claim 1, wherein the first thermally conductive body is arranged between and directly contacts (i) the busbar housing of the first electrical busbar of the electrical busbars and (ii) the adjoining structural component of the body of the motor vehicle.

13. The traction battery as claimed in claim 1, wherein the first thermally conductive body is arranged between (i) the busbar housing of the first electrical busbar of the electrical busbars and (ii) the adjoining module housing.

14. The traction battery as claimed in claim 1, wherein the first thermally conductive body is arranged between and directly contacts (i) the busbar housing of the first electrical busbar of the electrical busbars and (ii) the adjoining module housing.

15. The traction battery as claimed in claim 1, wherein the busbar housing of the first electrical busbar of the electrical busbars is sandwiched directly between the first and second thermally conductive bodies.

16. A traction battery for a motor vehicle, the traction battery comprising:
a plurality of battery modules, wherein each battery module comprises a module housing and battery cells accommodated in the respective module housing, wherein the battery cells of each battery module are electrically coupled together;
electrical busbars that electrically couple together the plurality of battery modules, wherein each of the electrical busbars comprises (i) a busbar core made of an electrically conductive material, and (ii) a busbar housing made of an electrically non-conductive material that surrounds an outside of the busbar core,
a first thermally conductive body arranged between (i) a busbar housing of a first electrical busbar of the electrical busbars, and (ii) one of an adjoining housing of the traction battery, an adjoining structural component of a body of the motor vehicle, or an adjoining module housing of one of the battery modules,
a second thermally conductive body arranged between the busbar core and the busbar housing of the first electrical busbar,
wherein the second thermally conductive body directly contacts both the busbar core and the busbar housing of the first electrical busbar.

\* \* \* \* \*